(12) United States Patent
Miyamoto et al.

(10) Patent No.: US 6,679,635 B2
(45) Date of Patent: Jan. 20, 2004

(54) OPTICAL DEVICE PERMITTING PASSIVE ALIGNMENT OF LENS ELEMENT

(75) Inventors: Yasuo Miyamoto, Tokyo (JP); Takeshi Takamori, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 128 days.

(21) Appl. No.: 09/916,301

(22) Filed: Jul. 30, 2001

(65) Prior Publication Data

US 2002/0037141 A1 Mar. 28, 2002

(30) Foreign Application Priority Data

Sep. 27, 2000 (JP) .......................... 2000-293600

(51) Int. Cl.[7] ................................................. G02B 6/36
(52) U.S. Cl. ............................. 385/88; 385/37; 385/89
(58) Field of Search ............................. 385/33, 37, 88, 385/89, 93, 52; 359/124, 130, 131

(56) References Cited

U.S. PATENT DOCUMENTS 5,420,953 A * 5/1995 Boudreau et al. ............. 385/88
5,611,006 A * 3/1997 Tabuchi ......................... 385/14
5,644,667 A * 7/1997 Tabuchi ......................... 385/49
6,093,939 A    7/2000 Artigue et al. ............... 257/99
6,157,502 A   12/2000 Kathman ...................... 359/819

* cited by examiner

*Primary Examiner*—Mark A. Robinson
*Assistant Examiner*—Alessandro Amari
(74) *Attorney, Agent, or Firm*—Wenderoth, Lind & Ponack, L.L.P.

(57) ABSTRACT

An optical device has a supporting substrate including at least a surface layer and an etching stopper layer. The surface layer is etched to create a window in which the etching stopper layer or a lower supporting layer is exposed. An optical substrate, in which a lens element is formed, is mounted upright on the exposed floor of the etched window. Another optical element such as an optical fiber, a laser diode, or a photodiode is mounted on the surface layer. This optical element is easily aligned with the lens element by passive methods by aligning the optical element and optical substrate in relation to marks on the upper surface of the supporting substrate, for example, or in relation to the sides of the window. Vertical alignment is automatically controlled by the thickness of the etched layers.

31 Claims, 4 Drawing Sheets

OPTICAL DEVICE PERMITTING PASSIVE ALIGNMENT OF LENS ELEMENT

BACKGROUND OF THE INVENTION

The present invention relates to an optical device in which a lens element is optically coupled to another optical element, more particularly to an optical device in which the alignment of the lens element and the other optical element is simplified.

Known alignment methods include passive methods such as the one disclosed by Tanaka et al. in IEICE Transactions on Electronics, Vol. E80-C, No. 1 (January 1997), pp. 107–111. This method aligns an optical fiber with a laser diode chip by mounting both of them on a supporting substrate referred to as a silicon platform. Photolithographic techniques are used to form a V-groove and fiducial marks simultaneously on the silicon platform. The optical fiber is mounted in the V-groove, the depth of which controls vertical alignment; the laser diode chip is mounted on a solder pad on the silicon platform and positioned in relation to the fiducial marks, which control horizontal alignment. Because of the high accuracy of photolithography, the laser diode chip can be positioned with sufficient accuracy to couple the emitted laser beam, which has a typical diameter of one to six micrometers (1–6 $\mu$m), into the optical fiber within an alignment tolerance of one to two micrometers (1–2 $\mu$m).

It would be desirable to extend this passive alignment technique to optical devices that also include lens elements, in particular to devices including diffractive lens elements such as computer-generated holograms (CGHs). Three-dimensional positioning of lens elements is more difficult, however. CGH elements cannot easily be mounted in V-grooves, for example. Accurate alignment of lens elements can be achieved by active techniques, in which the alignment is adjusted while test light is transmitted and the degree of optical coupling is measured, but active alignment has the disadvantages of taking time and requiring expensive test equipment.

SUMMARY OF THE INVENTION

An object of the present invention is to simplify the alignment of a lens element, such as a CGH element, with an optically coupled element mounted on a supporting substrate.

The invented optical device has a supporting substrate, an optical element mounted on the supporting substrate, an optical substrate, and a lens element formed in the optical substrate. The supporting substrate includes at least an etching stopper layer and a surface layer. The surface layer is partially removed by etching to create a window in which the etching stopper layer is exposed. Alternatively, the surface layer and the etching stopper layer are both partially removed to create a window in which a supporting layer underlying the etching stopper layer is exposed. The optical substrate is mounted on the surface of the exposed layer. The optical element is mounted on the surface layer.

In the invented optical device, accurate alignment can be achieved by passive two-dimensional horizontal positioning techniques, alignment in the third dimension being controlled automatically by the thickness of the surface layer, or the combined thickness of the surface layer and etching stopper layer, or this thickness and the shape and depth of a V-groove. The alignment process is accordingly quick and easy.

A silicon-on-insulator substrate of the type used for semiconductor integrated circuits can be used as the supporting substrate. Such substrates typically have a thin and very flat buried oxide (BOX) layer that can function as the etching stopper layer. The exposed surface in the window then has a high degree of flatness.

The optical element and optical substrate can be positioned in relation to marks in the surface layer. Such marks can be formed with high precision by photolithography and etching, leading to very accurate alignment of the optical element and the lens element.

The optical substrate can also be positioned in relation to the sides of the window, which can be defined accurately by photolithography.

The thickness of the surface layer, or the combined thickness of the surface layer and the etching stopper layer, should be accurate to within the alignment tolerance of the optical element and the lens element. A typical requirement is a surface layer one hundred micrometers thick with a thickness tolerance of plus-or-minus half a micrometer.

The lens element may be a CGH element formed in a side surface of the optical substrate, this surface being oriented perpendicular to the bottom surface of the optical substrate, which rests on the surface exposed in the window. Alternatively, the lens element may be another type of diffractive lens element, or a refractive lens element, including various types of bulk lens elements, and including aspherical lens elements.

The optical element mounted on the surface of the supporting substrate may be, for example, an optical fiber, a laser diode, or a photodiode. The optical device may have a plurality of such optical elements mounted on the same supporting substrate, and a plurality of lens elements formed in the same optical substrate.

DETAILED DESCRIPTION OF THE INVENTION

Embodiments of the invention will be described with reference to the attached drawings, in which like parts are indicated by like reference characters.

Figure 1:
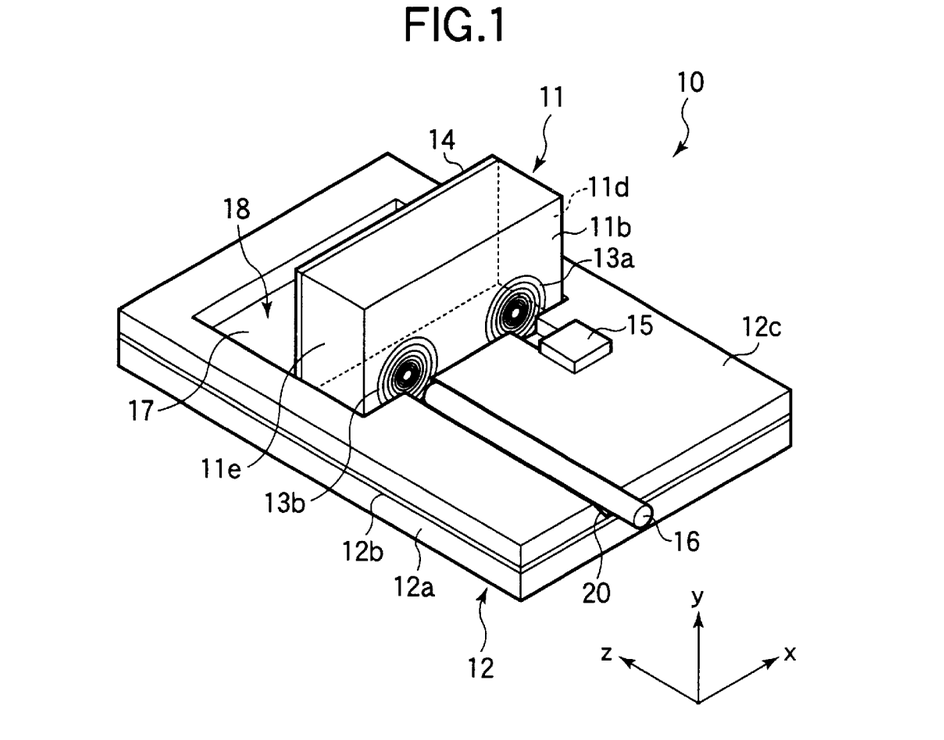
FIG. 1 shows a perspective view of an optical device embodying the invention.

Referring to FIG. 1, the first embodiment is an optical device 10 useful in uni-directional optical communication, comprising an optical substrate 11 and a supporting substrate 12.

Figure 2:
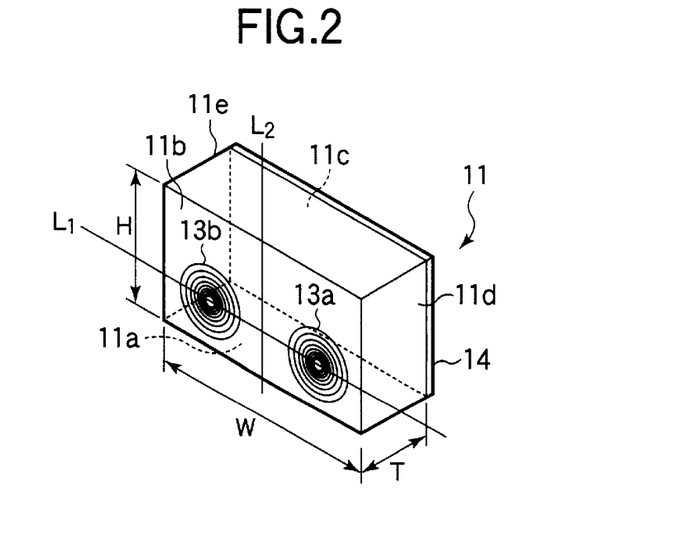
FIG. 2 shows a perspective view of the optical substrate in FIG. 1.

Referring to FIG. 2, the optical substrate 11 is a rectilinear quartz plate three millimeters high (H=3 mm), three millimeters wide (W=3 mm), and two millimeters thick (T=2 mm). The optical substrate 11 has a bottom surface 11a, two side surfaces 11b, 11c that rise at right angles from the long sides of the bottom surface 11a, separated by the thickness dimension (T) of the plate, and two side surfaces 11d, 11e that rise at right angles from the short sides of the bottom surface 11a, separated by the width dimension (W) of the plate. A pair of diffractive lens elements 13a, 13b are formed on side surface 11b. The opposite side surface 11c has a coating that forms a totally reflecting mirror 14.

In the following description, it will be assumed that the diffractive lens elements 13a, 13b are CGH elements. Such elements can be formed by photolithography and etching, using mask patterns calculated by a computer. The mask patterns can be adapted to give the CGH elements one or more of a variety of optical functions, including focusing, collimating, and deflection. In the present embodiment, lens element 13a has collimating and deflection functions, while lens element 13b has deflection and focusing functions.

The centers of the two CGH lens elements 13a, 13b are separated by a distance of, for example, half a millimeter (0.5 mm). The diameter of each lens element 13a, 13b is smaller than this separation; the diameter may be equal to three-eighths of a millimeter (0.375 mm), for example.

The CGH lens elements 13a, 13b and totally reflecting mirror 14 are fabricated on, for example, a three-inch quartz wafer, which is then cut with a slicer, yielding a plurality of identical optical substrates 11 of the type shown in FIG. 2. Available slicer equipment can cut with an accuracy of at least three-tenths of a micrometer ($\pm 0.3$ $\mu$m). That is, the line $L_1$ passing through the centers of the two lens elements 13a, 13b and the perpendicular bisecting line $L_2$ crossing line $L_1$ midway between the centers of the two lens elements 13a, 13b can be positioned to within a tolerance of $\pm 0.3$ $\mu$m with respect to the bottom surface 11a and side surfaces 11d, 11e of the optical substrate 11.

Referring again to FIG. 1, a light-emitting element, such as a laser diode 15, and an optical fiber 16 are mounted on the supporting substrate 12. These optical elements 15, 16 are optically coupled to the CGH lens elements 13a, 13b on the optical substrate 11 as follows. Light emitted from the laser diode 15 is collimated and deflected by lens element 13a, reflected from the totally reflecting mirror 14 to lens element 13b, and deflected and focused by lens element 13b onto the end of the optical fiber 16.

The supporting substrate 12 is a rectilinear plate with a silicon-on-insulator (SOI) structure, comprising a crystalline silicon layer 12a, a silicon oxide layer 12b formed on this crystalline silicon layer 12a, and another crystalline silicon layer 12c formed on the silicon oxide layer 12b. The first crystalline silicon layer 12a is a supporting layer with a thickness of, for example, five hundred micrometers (500 $\mu$m). The silicon oxide layer 12b, which functions as an etching stopper, has a thickness of, for example, one micrometer (1 $\mu$m). The second crystalline silicon layer 12c is a surface layer with a thickness of, for example, one hundred micrometers (100 $\mu$m). The surface of this crystalline silicon layer 12c is oriented in, for example, the {100} crystal lattice plane.

The thickness tolerance of the surface crystalline silicon layer 12c is related to the optical alignment tolerance in the y-axis direction in FIG. 1. Substrates are available in which the thickness of this layer has a specified tolerance of half a micrometer ($\pm 0.5$ $\mu$m).

Figure 3:
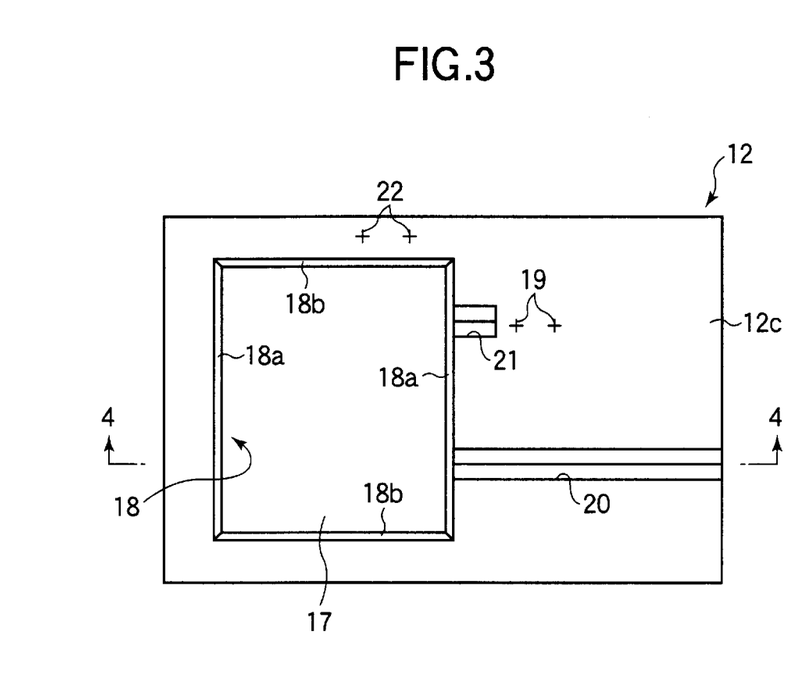
FIG. 3 shows a plan view of the supporting substrate in FIG. 1.

The optical substrate 11 is seated on a supporting surface 17 exposed by etching the surface crystalline silicon layer 12c to create an etched window 18. The shape of the etched window 18 is defined by an etching mask (not visible), which is formed by conventional photolithography. The etching is carried out by a wet anisotropic etching process, using an etchant such as potassium hydroxide. Referring to FIG. 3, the side walls 18a, 18b of the etched window 18 are inclined at an angle of fifty-five degrees (55°) to the supporting surface 17. The side walls 18a, 18b are oriented in the (111) crystal lattice plane.

The silicon oxide layer 12b is etched by potassium hydroxide at a much slower rate than the crystalline silicon layer 12c, so when all of the crystalline silicon layer 12c has been removed from the etched window 18, the silicon oxide layer 12b remains substantially intact; that is, the etching is substantially stopped at the silicon oxide layer 12b. The supporting surface 17 is thus substantially identical to the surface of the silicon oxide layer 12b, and is therefore substantially flat. A flat supporting surface 17 can be obtained relatively easily in this way.

A pair of cross marks 19 are formed in the surface crystalline silicon layer 12c near one of the long sides 18a of the etched window 18, for alignment of the laser diode 15. A pair of V-grooves 20, 21 are also formed in the surface crystalline silicon layer 12c, facing this same long side 18a. The shorter V-groove 21 is disposed between the cross marks 19 and the long side 18a, to provide an unobstructed path for the light beam emitted by the laser diode. Another pair of cross marks 22 are formed on the surface crystalline silicon layer 12c near one of the short sides 18b of the etched window 18, for alignment of the optical substrate 11 in the x- and z-directions in FIG. 1.

The invention is not limited to the use of cross marks. Alignment marks with other geometries can be used instead.

Each of the cross marks 19, 22 comprises a segment parallel to the optic axes of the CGH lens elements 13a, 13b, that is, parallel to the z-axis in FIG. 1, and another segment perpendicular to this segment, parallel to the x-axis in FIG. 1. The cross marks 19, 22 and V-grooves 20, 21 are formed by photolithography and etching. The well-known and highly accurate lift-off technique is preferably used to form the cross marks 19, 22. The V-grooves 20, 21 are etched by a wet anisotropic etching process, so that their sides are oriented in particular crystal lattice planes, giving the grooves a very accurate V-shape.

The laser diode 15 is positioned and mounted on the supporting substrate 12 by conventional methods, e.g., by the use of infrared light to observe the positions of the cross marks 19 through the laser diode. The laser diode 15 can be positioned with high accuracy in this way.

The optical fiber 16 is positioned with high accuracy in the x- and y-directions simply by being held in the V-groove 20, which has an accurate position, shape, and depth defined by photolithography and the orientation-dependent anisotropic etching process. Accurate positioning in the z-direction is achieved by, for example, positioning the end of the optical fiber 16 in relation to the cross marks 19 or 22, or the adjacent side of the etched window 18.

Figure 4:
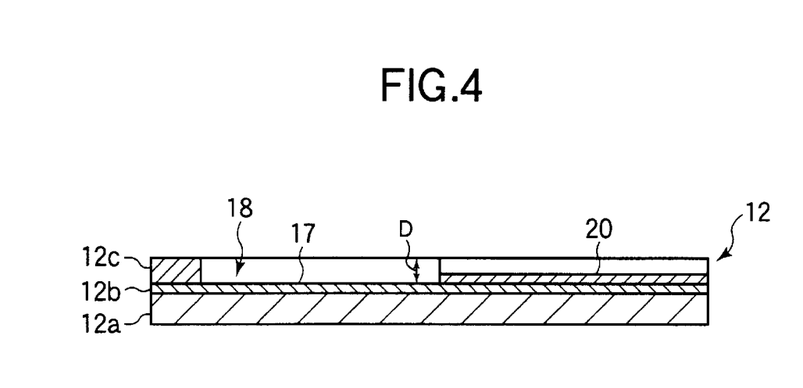
FIG. 4 shows a sectional view of the supporting substrate through line 4—4 in FIG. 3.

After the laser diode 15 and optical fiber 16 have been mounted, the optical substrate 11 is placed with its bottom surface 11a resting on the supporting surface 17 of the etched window 18, and is positioned with reference to the cross marks 22. Positioning in the x-direction is based on the distance from the short side 11d (or 11e) to the cross marks 22. Positioning in the z-direction, parallel to the optic axis, is based on the distance from either long side 11b or 11c to a line passing through the center of one of the cross marks 22 and parallel to the x-axis in FIG. 1. Positioning in the y-direction is controlled automatically by the thickness of the surface crystalline silicon layer 12c, that is, by the dimension D in FIG. 4. The accuracy of this thickness assures accurate positioning in the y-direction. The high degree of flatness of the supporting surface 17 on which the bottom surface 11a of the optical substrate 11 rests also contributes to accurate positioning.

Since the optical substrate 11 is accurately positioned with reference to the cross marks 22 and the supporting surface 17 of the etched window 18, the laser diode 15 is accurately positioned with reference to the cross marks 19, and the optical fiber 16 is accurately positioned in the V-groove 20, the optic axes of the CGH lens elements 13a, 13b are accurately aligned with the optic axes of the laser diode 15 and optical fiber 16. It is not necessary to adjust the axial alignment by use of test light emitted from the laser diode 15.

Although purely passive, the positioning process described above achieves an alignment accuracy of one micrometer (1 μm) or better in each of the x-, y-, and z-directions. Moreover, the positioning process is two-dimensional; it is only necessary to position the optical substrate 11 and elements 15, 16 in the x-z plane, with reference to the cross marks 19, 22. The optic axes can be aligned quickly and easily in this way.

The optical device 10 was evaluated by operating the laser diode 15 at an optical power of two milliwatts (2 mW). The power measured at the output end of the optical fiber 16 was 1.8 mW; over ninety percent (90%) of the light emitted from the laser diode 15 was coupled into the optical fiber 16.

In a variation of the first embodiment, the cross marks 22 near the short side 18b of the etched window are eliminated and the optical substrate 11 is positioned in relation to any two perpendicular sides 18a, 18b of the etched window 18. In this case, the wet anisotropic etching process described above is preferably replaced by a dry anisotropic etching process, which can create side walls 18a, 18b that rise perpendicular to the supporting surface 17 of the etched window 18. This simplifies the positioning of the optical substrate 11 in the x- and z-directions, and makes the positioning more accurate.

In another variation of the first embodiment, the supporting surface 17 of the etched window 18 is the surface of the supporting crystalline silicon layer 12a, instead of the surface of the silicon oxide layer 12b. After the surface crystalline silicon layer 12c has been etched as described above, the silicon oxide layer 12b exposed in the window 18 is etched with an etchant such as a fluorine-based etchant that etches silicon oxide faster than crystalline silicon. In this etching step, the supporting crystalline silicon layer 12a functions as an etching stopper. The silicon oxide layer 12b is eliminated from the window 18 and the flat surface of the supporting crystalline silicon layer 12a is exposed, so that it can be used to support the optical substrate 11.

In this variation, the combined thickness of the surface crystalline silicon layer 12c and the silicon oxide layer 12b must be accurate to within the alignment tolerance in the y-direction. If this alignment tolerance is ±2 μm, for example, then the supporting substrate 12 should be an SOI substrate in which the combined thickness of these layers 12b, 12c is specified to a tolerance of ±2 μm or less. The optical substrate 11 can be positioned on the supporting crystalline silicon layer 12a with reference to cross marks formed in the surface crystalline silicon layer 12c, or with reference to two perpendicular the sides of the etched window, as described above.

In still another variation of the first embodiment, a light-receiving element such as a photodiode replaces the laser diode 15 as the optical element mounted on the supporting substrate 12. In this variation, CGH lens element 13a has deflection and focusing functions, while CGH lens element 13b has deflection and collimating functions. Light transmitted from an external source through the optical fiber 16 is emitted toward and collimated by lens element 13b, reflected by the totally reflecting mirror 14, and focused by lens element 13a onto the photodiode, which then converts the light to an electrical signal.

Figure 5:
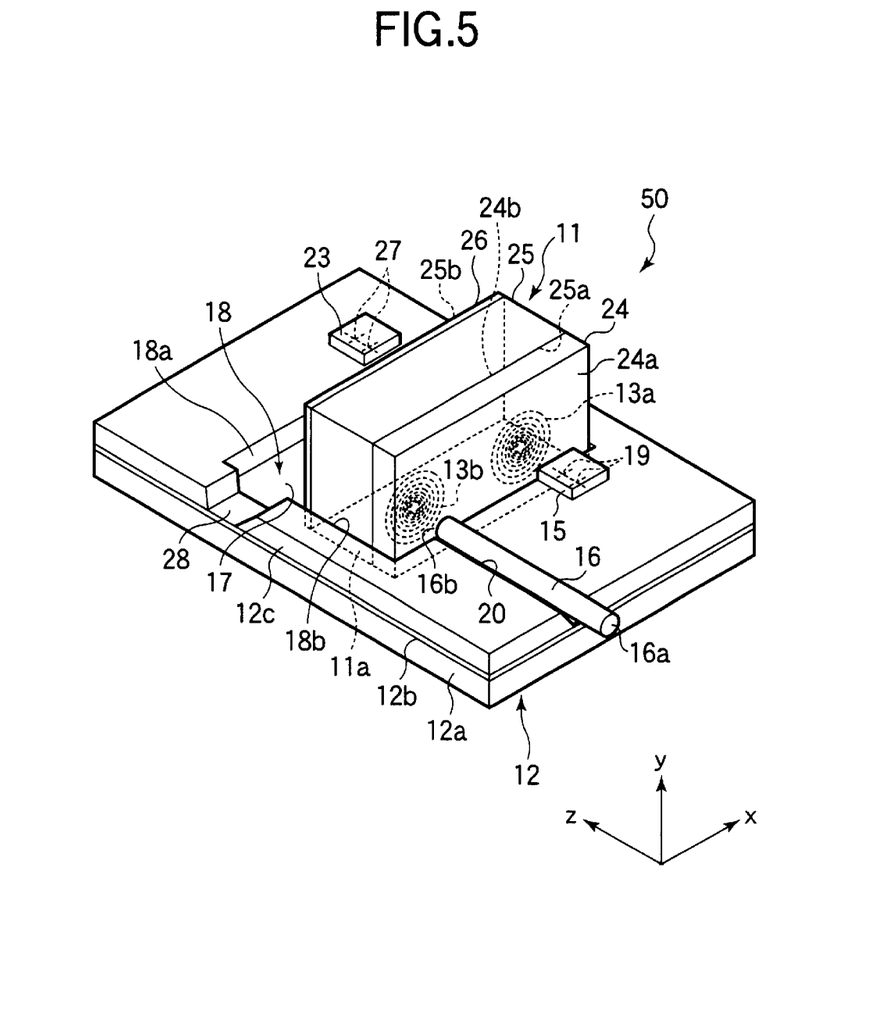
FIG. 5 shows a perspective view of another optical device embodying the invention.

As a second embodiment, FIG. 5 shows an optical device 50 useful in bi-directional optical communication.

This optical device 50 has a supporting substrate 12 generally similar to the one in the first embodiment, with a silicon oxide layer 12b buried between two crystalline silicon layers 12a, 12c, the oxide layer 12b being partially exposed in a rectangular etched window 18 formed in the surface crystalline silicon layer 12c. A light-emitting element, such as a laser diode 15, that emits light with a wavelength $\lambda_1$ is mounted on the surface crystalline silicon layer 12c adjacent to a long side of the etched window 18. An optical fiber 16 is mounted in a V-groove 20 in the surface crystalline silicon layer 12c. One end 16a of the optical fiber 16 is coupled to a distant light source (not visible) that emits light with a different wavelength $\lambda_2$. The other end 16b of the optical fiber 16 is substantially flush with the above-mentioned long side of the etched window 18. In addition, a light-receiving element, such as a photodiode 23, is mounted on the surface crystalline silicon layer 12c near the opposite long side 18a of the etched window 18, to receive light of wavelength $\lambda_2$.

The optical substrate 11 mounted on the exposed supporting surface 17 in the etched window 18 now comprises two optical plates 24, 25 joined together. Optical plate 24 is made of quartz, for example, and has a surface 24a facing the laser diode 15 and optical fiber 16. A pair of CGH lens elements 13a, 13b are formed on the opposite surface 24b of this optical plate 24, which is joined to one surface 25a of the other optical plate 25. A wavelength-division multiplexing (WDM) filter 26 is formed on the opposite surface 25b of this optical plate 25. The WDM filter 26 comprises, for example, a multi-layer dielectric film that reflects light of wavelength $\lambda_1$ while transmitting light of wavelength $\lambda_2$.

Cross marks are formed in the surface crystalline silicon layer 12c. The optical substrate 11 is positioned in relation to cross marks (not visible) disposed near one of the short sides 18b of the etched window 18, as described in the first embodiment. The laser diode 15 is positioned with reference to cross marks 19, as also described in the first embodiment. The photodiode 23 is positioned with reference to similar cross marks 27. The optical fiber 16 is positioned by being held in the V-groove 20. As in the first embodiment, the positioning process is a passive two-dimensional process carried out in the x-z plane. The optic axes of the two CGH lens elements 13a, 13b, the optic axes of the laser diode 15 and optical fiber 16, and the active part of the photodiode 23 can be aligned quickly and easily in this way, alignment in the y-direction being controlled by the shape and depth of the V-groove 20 and the thickness of the surface crystalline silicon layer 12c.

A trench 28 extends from each short side 18b of the etched window 18 to the edge of the optical device 50. The floor of the trench 28 is the silicon oxide layer 12b. The trench 28 and window 18 can be formed by the same photolithography and etching process. The trench 28 divides the surface crystalline silicon layer 12c into two electrically isolated parts, thereby preventing the propagation of high-frequency electrical noise between the laser diode 15 and the photodiode 23.

During operation, light of wavelength $\lambda_1$, emitted by the laser diode 15, is deflected and collimated into a parallel beam by lens element 13a, reflected toward lens element 13b by the WDM filter 26, and deflected and focused onto the near end 16b of the optical fiber 16 by lens element 13b. Light of wavelength $\lambda_2$, transmitted from the far end 16a of the optical fiber 16, is emitted as a divergent beam from the near end 16b of the optical fiber 16, is focused and deflected by lens element 13b toward the photodiode 23, reaches the photodiode 23 after being transmitted through the WDM filter 26, and is converted by the photodiode 23 to an electrical signal.

In evaluation tests, this optical device 50 demonstrated a coupling efficiency of 85% between the laser diode 15 and optical fiber 16 at wavelength $\lambda_1$, and a coupling efficiency of 90% between the optical fiber 16 and photodiode 23 at wavelength $\lambda_2$.

In a variation of the second embodiment, the optical substrate 11 is positioned in relation to two perpendicular sides 18a, 18b of the etched window 18, instead of being positioned in relation to cross marks formed in the surface crystalline silicon layer 12c.

In another variation of the second embodiment, the optical substrate 11 has the structure shown in FIG. 2, except that the totally reflecting mirror 14 is replaced by a WDM filter.

Figure 6:
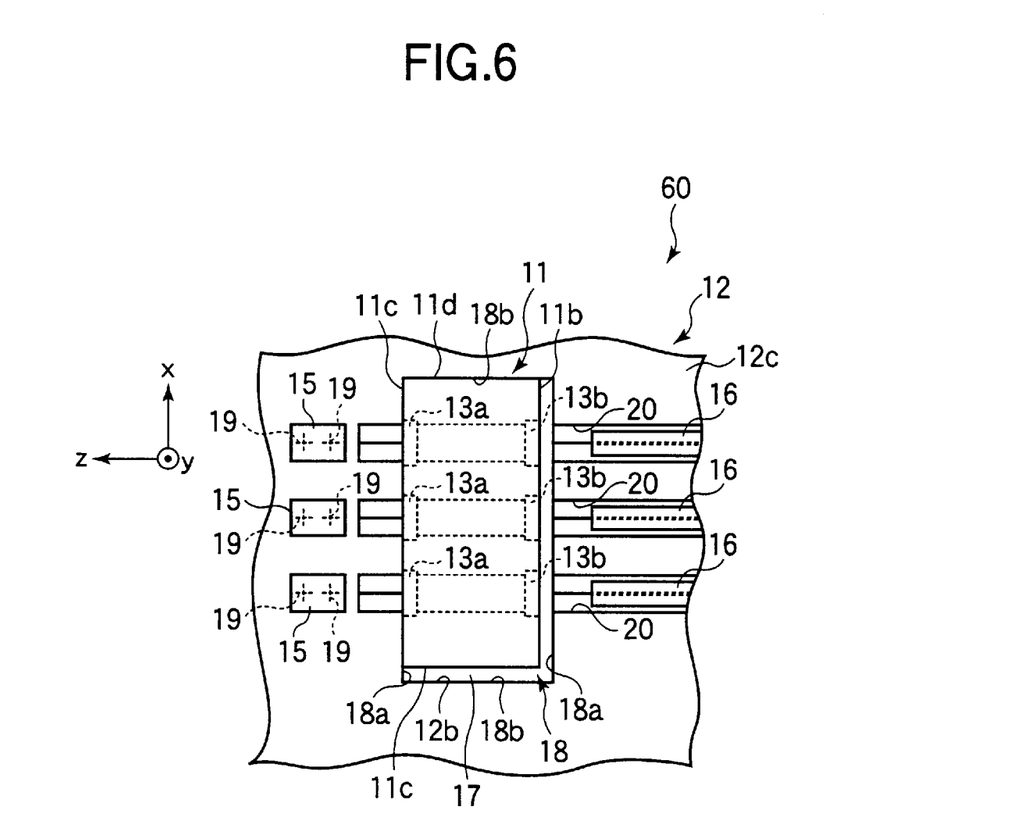
FIG. 6 shows a perspective view of yet another optical device embodying the invention.

As a third embodiment, FIG. 6 shows an optical device 60 in which a plurality of laser diodes 15 are mounted side by side on the supporting substrate 12, facing a matching plurality of optical fibers 16. The laser diodes 15 are positioned with reference to cross marks 19 formed in the surface crystalline silicon layer 12c of the supporting substrate 12. The optical fibers 16 are positioned by being held in V-grooves 20 formed in the surface crystalline silicon layer 12c. The cross marks 19 and V-grooves 20 are formed by photolithography and etching as described in the first embodiment.

An etched window 18 is formed in the surface crystalline silicon layer 12c, transecting the V-grooves 20 and exposing the buried silicon oxide layer 12b. One long side 18a of the etched window 18 faces the laser diodes 15; the V-grooves 20 extend from this side of the etched window 18 to points near the emitting facets of the laser diodes 15. The other long side 18a of the etched window 18 faces the ends of the optical fibers 16, which are disposed at a certain distance from the etched window 18.

The optical substrate 11 in the third embodiment is a rectilinear quartz plate having CGH lens elements 13a formed in one upright side 11c, facing the laser diodes 15, and CGH lens elements 13b formed in the opposite upright side 11b, facing the optical fiber 16. The bottom surface (not visible) of the optical substrate 11 rests on a supporting surface 17 formed by the silicon oxide layer 12b exposed in the etched window 18. The optical substrate 11 is positioned with reference to two perpendicular sides 18a, 18b of the etched window 18, by being mounted in direct contact with these two sides 18a, 18b, for example.

As in the preceding embodiments, the positioning process is a passive two-dimensional process carried out in the x-z plane, alignment in the y-direction controlled by the shape and depth of the V-grooves 20 and the thickness of the surface crystalline silicon layer 12c.

During operation, light emitted by the laser diodes 15 is collimated by lens elements 13a to form parallel beams, which are then focused by lens elements 13b onto the ends of the optical fibers 16. In evaluation tests, with the laser diodes 15 driven at an optical output power of two milliwatts (2 mW), the optical power measured at the output ends of the optical fibers 16 was 1.8 mW, indicating an optical coupling efficiency of at least 90%.

The embodiments described above can be modified by using silicon or various other optical materials for the optical substrate 11, instead of quartz.

The invention is not limited to the use of CGH lens elements. The invention can be practiced with other types of diffractive lens elements, or with various types of refractive lens elements. Fresnel lens elements can be used, for example.

The supporting substrate 12 need not be an SOI substrate. Another possible substrate is a glass substrate having one or more crystalline layers, such as silicon layers, deposited on one surface. This type of layered substrate can also be etched with potassium hydroxide, the glass substrate acting as an etching stopper. The optical substrate 11 then rests on the glass substrate where it is exposed in the etched window. Various other etchants can also be used, depending on the types of layers to be etched.

The shape of the etched window need not be rectangular.

Those skilled in the art will recognize that further variations are possible within the scope claimed below.

What is claimed is:

1. An optical device having a supporting substrate, an optical element mounted on the supporting substrate, an optical substrate, and a lens element formed in the optical substrate, the supporting substrate comprising:
   an etching stopper layer; and
   a surface layer formed on the etching stopper layer, the surface layer being partially removed by etching to create a window in which the etching stopper layer is exposed as a flat floor of the window; wherein
   the optical element is mounted on the surface layer of the supporting substrate; and
   the optical substrate having said lens element formed therein is mounted on the etching stopper layer of the supporting substrate where the etching stopper layer is exposed as the flat floor of the window.

2. The optical device of claim 1, the surface layer of the supporting substrate having a first mark for positioning of the optical element, and a second mark for positioning of the optical substrate.

3. The optical device of claim 1, the surface layer of the supporting substrate having a first mark for positioning of the optical element, the window having two mutually perpendicular sides, the optical substrate being positioned with reference to said two mutually perpendicular sides.

4. The optical device of claim 1, wherein the optical substrate has a rectilinear shape with a bottom surface resting on the exposed etching stopper layer and a side surface perpendicular to the bottom surface, the lens element being formed in said side surface.

5. The optical device of claim 1, wherein the supporting substrate has a silicon-on-insulator structure with a first crystalline silicon layer functioning as a supporting layer, the etching stopper layer being a silicon oxide layer disposed on the first crystalline silicon layer, the surface layer being a second crystalline silicon layer.

6. The optical device of claim 1, wherein the lens element is a diffractive lens element.

7. The optical device of claim 1, wherein the optical element and the lens element have an alignment tolerance, and the surface layer of the supporting substrate has a thickness tolerance equal at most to the alignment tolerance.

8. The optical device of claim 1, said optical element being a light-emitting element emitting light of a first wavelength, the surface layer including a V-shaped groove leading up to said window, the optical device also having an optical fiber mounted in the V-shaped groove, the optical substrate including a first optical plate and a second optical plate each having a first surface and a second surface both rising perpendicularly from the etching stopper layer, the first surface of the first optical plate being joined to the first surface of the second optical plate, the first surface of the first optical plate having a pair of lens elements formed therein, said lens element being one of said pair of lens elements, the pair of lens elements including a first lens element facing said light-emitting element and a second lens element facing said optical fiber, the second surface of the second optical plate reflecting said light of the first wavelength and transmitting light of a second wavelength, the first lens element, the second surface of the second optical plate, and the second lens element forming an optical path on which the light of the first wavelength emitted by the light-emitting element is transmitted through the first lens element, reflected by the second surface of the second optical plate, and transmitted through the second lens element to said optical fiber, the optical device further comprising:

a light-receiving element mounted on said surface layer, facing the second surface of the second optical plate, to receive light of the second wavelength transmitted from said optical fiber through the second lens element and said second surface of the second optical plate.

9. The optical device of claim 8, wherein the light-emitting element is a laser diode.

10. The optical device of claim 8, wherein the light-receiving element is a photodiode.

11. The optical device of claim 8, wherein the second surface of the second optical plate has a multi-layer dielectric film formed thereon.

12. The optical device of claim 1, wherein said optical element is one of a plurality of optical elements mounted on said surface layer, the surface layer having a plurality of V-shaped grooves leading up to said window, the optical device also including a plurality of optical fibers mounted in the V-shaped grooves, the optical substrate having a first surface and a second surface both rising perpendicularly from the etching stopper layer, the first surface having a plurality of first lens elements formed therein, said lens element being one of said plurality of lens elements, the first lens elements facing respective ones of said optical elements, the second surface having a plurality of second lens elements formed therein, the second lens elements facing respective ones of said optical fibers, said first lens elements and said second lens elements forming optical paths between said respective ones of said optical elements and said respective ones of said optical fibers.

13. The optical device of claim 12, wherein said first surface and said second surface are mutually parallel.

14. The optical device of claim 12, wherein said optical elements are light-emitting elements.

15. The optical device of claim 14, wherein said optical elements are laser diodes.

16. An optical device having a supporting substrate, an optical element mounted on the supporting substrate, an optical substrate, and a lens element formed in the optical substrate, the supporting substrate comprising:

a supporting layer;

an etching stopper layer formed on the supporting layer; and a surface layer formed on the etching stopper layer; wherein the surface layer and the etching stopper layer are partially removed by etching to create a window in which the supporting layer is exposed as a flat floor of the window;

the optical element is mounted on the surface layer of the supporting substrate; and the optical substrate having said lens element formed therein is mounted on the supporting layer of the supporting substrate where the supporting layer is exposed as the flat floor of the window.

17. The optical device of claim 16, the surface layer of the supporting substrate having a first mark for positioning of the optical element, and a second mark for positioning of the optical substrate.

18. The optical device of claim 16, the surface layer of the supporting substrate having a first mark for positioning of the optical element, the window having two mutually perpendicular sides, the optical substrate being positioned with reference to said two mutually perpendicular sides.

19. The optical device of claim 16, wherein the optical substrate has a rectilinear shape with a bottom surface resting on the exposed supporting layer of the supporting substrate and a side surface perpendicular to the bottom surface, the lens element being formed in said side surface.

20. The optical device of claim 16, wherein the supporting substrate has a silicon-on-insulator structure, the supporting layer being a first crystalline silicon layer, the etching stopper layer being a silicon oxide layer, the surface layer being a second crystalline silicon layer.

21. The optical device of claim 16, wherein the lens element is a diffractive lens element.

22. The optical device of claim 16, wherein the optical element and the lens element have an alignment tolerance, and the surface layer and the etching stopper layer of the supporting substrate have a combined thickness tolerance equal at most to the alignment tolerance.

23. An optical device, comprising:

a supporting substrate having at least an etching stopper layer and a surface layer, the surface layer being partially removed by etching to create a window within which the etching stopper layer is exposed, and to create a V-shaped groove leading up to the window;

an optical element mounted on said surface layer;

an optical fiber mounted in the V-shaped groove; and an optical substrate mounted on the etching stopper layer of the supporting substrate within said window, the optical substrate having a first surface and a second surface both rising perpendicularly from the etching stopper layer, the first surface having a pair of lens elements formed therein, the second surface being a reflecting surface, the pair of lens elements including a first lens element facing said optical element and a second lens element facing said optical fiber, the first lens element, the reflecting second surface, and the second lens element forming an optical path between said optical element and said optical fiber.

24. The optical device of claim 23, wherein said second surface has a coating formed thereon.

25. The optical device of claim 23, wherein said optical element is a light-emitting element, and light emitted by said optical element is transmitted through the first lens element, reflected by the second surface of the optical substrate, and transmitted through the second lens element to said optical fiber.

26. The optical device of claim 25, wherein said optical element is a laser diode.

27. The optical device of claim 25, wherein said second surface reflects light of a first wavelength and transmits light of a second wavelength, the light emitted by said optical element being of the first wavelength, further comprising:

a light-receiving element mounted on said surface layer, facing the second surface of said optical substrate, to receive light of the second wavelength transmitted from said optical fiber through the second lens element and said second surface.

28. The optical device of claim 27, wherein the second surface of the optical substrate has a multi-layer dielectric film formed thereon.

29. The optical device of claim 27, wherein the light-receiving element is a photodiode.

30. The optical device of claim 23, wherein said optical element is a light-receiving element for receiving light transmitted from said optical fiber through the second lens element to the second surface of the optical substrate, reflected by said second surface, then transmitted through the first lens element.

31. The optical device of claim 30, wherein said optical element is a photodiode.

* * * * *